(12) United States Patent
Murakami et al.

(10) Patent No.: US 10,452,785 B2
(45) Date of Patent: Oct. 22, 2019

(54) TRANSLATION ASSISTANCE SYSTEM, TRANSLATION ASSISTANCE METHOD AND TRANSLATION ASSISTANCE PROGRAM

(71) Applicant: Rakuten, Inc., Tokyo (JP)

(72) Inventors: Koji Murakami, Tokyo (JP); Kiyoshi Sudo, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/911,460

(22) Filed: Mar. 5, 2018

(65) Prior Publication Data

US 2018/0260390 A1   Sep. 13, 2018

Related U.S. Application Data

(60) Provisional application No. 62/469,255, filed on Mar. 9, 2017.

(51) Int. Cl.
*G06F 17/28* (2006.01)

(52) U.S. Cl.
CPC ...... *G06F 17/2836* (2013.01); *G06F 17/2854* (2013.01)

(58) Field of Classification Search
CPC .. G06F 17/2836; G06F 17/2854; G06F 17/28; G06F 17/2809; G06F 17/2818; G06F 17/2827; G06F 17/2872; G06F 17/289; G06F 16/2452; G06F 16/24522; G06F 16/3332; G06F 16/3337; G06F 16/8358
See application file for complete search history.

(56) References Cited

U.S. PATENT DOCUMENTS

| | | | | |
|---|---|---|---|---|
| 2004/0128288 A1* | 7/2004 | Cancedda | ............. | G06F 16/334 |
| 2005/0137854 A1* | 6/2005 | Cancedda | ............... | G06F 17/28 704/9 |
| 2006/0142995 A1* | 6/2006 | Knight | .................. | G06F 17/227 704/9 |
| 2008/0270112 A1* | 10/2008 | Shimohata | ............ | G06F 17/289 704/3 |
| 2009/0157386 A1* | 6/2009 | Zhou | ....................... | G06F 17/28 704/9 |

(Continued)

OTHER PUBLICATIONS

Keiji Yasuda et al.; "Applications of Automatic Evaluation Methods to Measuring a Capability of Speech Translation System", In Proceedings of the 10th Conference of the European Chapter of the Association for Computational Linguistics (EACL) Apr. 2003; pp. 371-378.

(Continued)

*Primary Examiner* — Andrew C Flanders
(74) *Attorney, Agent, or Firm* — Sughrue Mion, PLLC

(57) ABSTRACT

A translation assistance system according to one embodiment includes an acquisition unit and a determination unit. The acquisition unit acquires a target translated text obtained by translating a target source text into a target language, and acquires, as a correct word set, a set containing a reference word n-gram forming a reference text written in the target language and independent of the target source text. The determination unit calculates a degree of matching between one or more translated word n-grams forming the target translated text and the correct word set, and determines adequacy of the target translated text based on the degree of matching.

9 Claims, 10 Drawing Sheets

(56) References Cited

U.S. PATENT DOCUMENTS

| | | | |
|---|---|---|---|
| 2010/0274552 A1* | 10/2010 | Gao | G06F 17/2854 704/2 |
| 2012/0209590 A1* | 8/2012 | Huerta | G06F 17/2818 704/7 |
| 2012/0253783 A1* | 10/2012 | Castelli | G06F 17/2818 704/3 |
| 2012/0284015 A1* | 11/2012 | Drewes | G06F 17/2818 704/3 |
| 2012/0303352 A1* | 11/2012 | Coen | G06F 17/2827 704/2 |
| 2014/0188453 A1* | 7/2014 | Marcu | G06Q 10/0639 704/2 |
| 2014/0358519 A1* | 12/2014 | Mirkin | G06F 17/2854 704/3 |
| 2014/0358524 A1* | 12/2014 | Papula | G06F 17/2854 704/9 |
| 2017/0169015 A1* | 6/2017 | Huang | G06F 17/2872 |
| 2019/0012315 A1* | 1/2019 | Zhang | G06F 17/2854 |

OTHER PUBLICATIONS

Shimada Masahiko, et al., "QoS Evaluation Method for Selecting Machine Translators", IEICE Technical Report, Japan, The Institue of Electronics, Information and Communication Engineers, Feb. 21, 2011, vol. 110, No. 428, pp. 57-62 (8 pages total).
Communication dated May 15, 2018, from the Japanese Patent Office in counterpart application No. 2018-034514.

\* cited by examiner

TRANSLATION ASSISTANCE SYSTEM, TRANSLATION ASSISTANCE METHOD AND TRANSLATION ASSISTANCE PROGRAM

TECHNICAL FIELD

One aspect of the present invention relates to a translation assistance system, a translation assistance method, and a translation assistance program.

BACKGROUND

A technique to evaluate the adequacy of human or machine translations is known. For example, a technique that evaluates speech translations by the pair comparison method using several automatic evaluations, which are called the BLEU, NIST and DP-based methods, is disclosed in the following Non Patent Literature 1.

[NPL1] Keiji Yasuda, Fumiaki Sugaya, Toshiyuki Takezawa, Seiichi Yamamoto, and Masuzo Yanagida, "Applications of automatic evaluation methods to measuring a capability of speech translation system," In Proceedings of the 10th Conference of the European Chapter of the Association for Computational Linguistics (EACL 2003), April 2003, pages 371-378.

SUMMARY

However, because the technique disclosed in Non Patent Literature 1 is based on the assumption that correct translations (reference translations) exist, it is necessary to prepare correct translations in advance in order to evaluate each translated text. Such advance preparation requires significant time and effort, and it is desirable to evaluate the adequacy of a translated text without using a correct translation of the text to be evaluated.

A translation assistance system according to one aspect of the present invention includes an acquisition unit configured to acquire a target translated text obtained by translating a target source text into a target language, and acquire, as a correct word set, a set containing a reference word n-gram forming a reference text written in the target language and independent of the target source text, and a determination unit configured to calculate a degree of matching between one or more translated word n-grams forming the target translated text and the correct word set, and determine adequacy of the target translated text based on the degree of matching.

A translation assistance method according to one aspect of the present invention is a translation assistance method performed by a translation assistance system including at least one processor, the method including an acquisition step of acquiring a target translated text obtained by translating a target source text into a target language, and acquiring, as a correct word set, a set containing a reference word n-gram forming a reference text written in the target language and independent of the target source text, and a determination step of うい calculating a degree of matching between one or more translated word n-grams forming the target translated text and the correct word set, and determining adequacy of the target translated text based on the degree of matching.

A translation assistance program according to one aspect of the present invention causes a computer system to execute an acquisition step of acquiring a target translated text obtained by translating a target source text into a target language, and acquiring, as a correct word set, a set containing a reference word n-gram forming a reference text written in the target language and independent of the target source text, and a determination step of calculating a degree of matching between one or more translated word n-grams forming the target translated text and the correct word set, and determining adequacy of the target translated text based on the degree of matching.

In the above aspects, a reference text that is prepared as a reference to determine the adequacy of a target translated text (translated text to be evaluated) is a text independent of a target source text, and therefore it is also independent of a translated text of the source text (target translated text). It is thus not necessary to prepare a correct translation of the target translated text in order to evaluate the adequacy of the target translated text. The correct word set is a set of word n-grams of reference texts (reference word n-grams), and it is a set of words or phrases that can be regarded as correct. Thus, with the degree of matching between the word n-gram of the target translated text and the correct word set, it is possible to evaluate the adequacy of the translated text without using a correct translation of the text to be evaluated.

According to one aspect of the present invention, it is possible to evaluate the adequacy of a translated text without using a correct translation of the text to be evaluated.

DETAILED DESCRIPTION

An embodiment of the present invention is described hereinafter in detail with reference to the appended drawings. Note that, in the description of the drawings, the same or equivalent elements are denoted by the same reference symbols, and the redundant explanation thereof is omitted.

[System Configuration]

A translation assistance system 10 according to an embodiment is a computer system that evaluates the adequacy of human or machine translations. "To evaluate the adequacy of a translation" means to objectively determine how correct a translated result is in terms of meaning and expression according to specified criteria. One of the features of the translation assistance system 10 is to evaluate the adequacy of a translated text without using a correct translation of the text to be evaluated (reference translation indicating the way the text should be translated). To be more specific, the translation assistance system 10 evaluates the adequacy of a translated text based on clues which are independent of the text in the situation with no information about the way the text to be evaluated should be translated. Another feature of the translation assistance system 10 is to generate a correct translation dictionary based on evaluation results.

Figure 1:
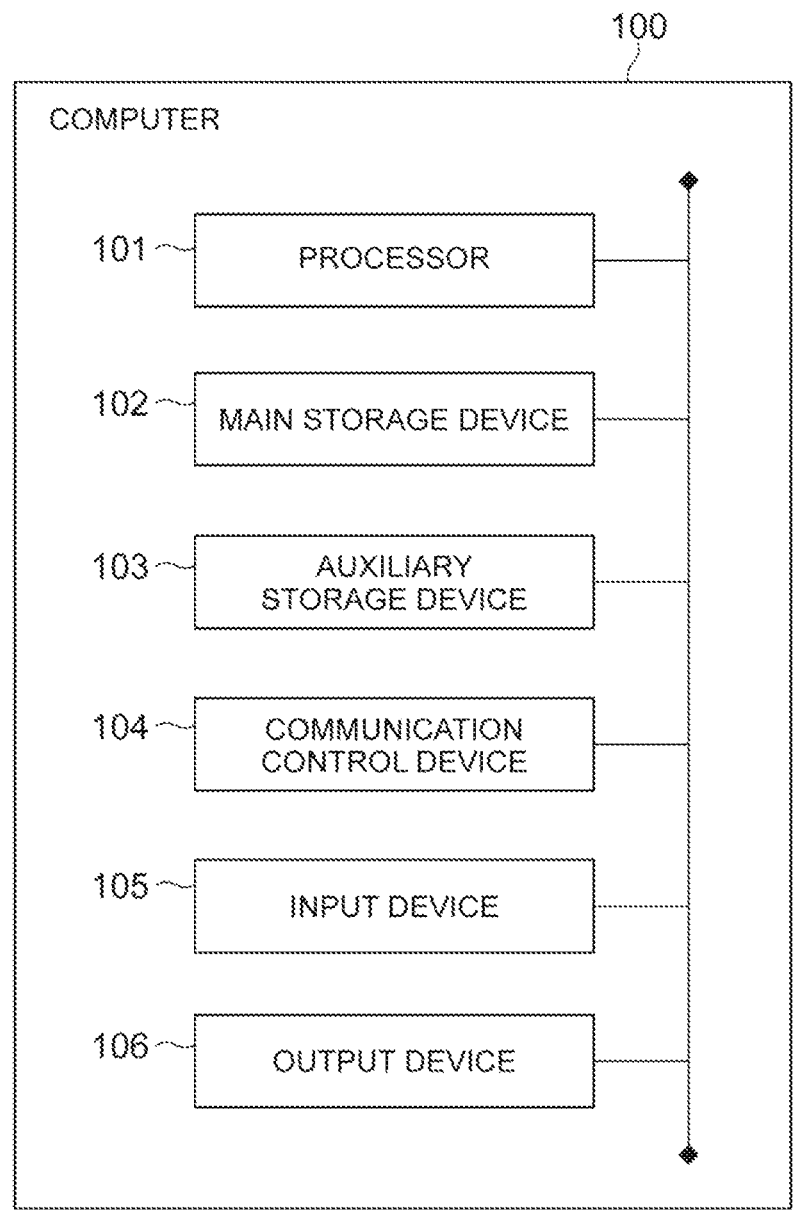
FIG. 1 is a view showing the hardware configuration of a computer that is used in a translation assistance system according to an embodiment.

FIG. 1 shows a typical hardware configuration of a computer 100 that constitutes the translation assistance system 10. For example, the computer 100 includes a processor 101, a main storage unit 102, an auxiliary storage unit 103, a communication control unit 104, an input device 105, and an output device 106. The processor 101 runs an operating system and an application program. The main storage unit 102 is ROM and RAM, for example. The auxiliary storage unit 103 is a hard disk or a flash memory, for example, and it generally stores a larger volume of data than the main storage unit 102. The communication control unit 104 is a network card or a wireless communication module, for example. The input device 105 is a keyboard, a mouse, a touch panel or the like, for example. The output device 106 is a monitor and a speaker, for example.

The functional elements of the translation assistance system 10 are implemented by loading given software (for example, a translation assistance program P1, which is described later) onto the processor 101 or the main storage device 102 and running the program. The processor 101 makes the communication control device 104, the input device 105 or the output device 106 operate in accordance with the software, and reads and writes data to and from the main storage device 102 or the auxiliary storage device 103. Data or databases required for the processing are stored in the main storage device 102 or the auxiliary storage device 103.

The translation assistance system 10 may be composed of a single computer or a plurality of computers. In the case of using a plurality of computers, those computers are connected through a communication network such as the Internet or an intranet, and thereby one translation assistance system 10 is logically constructed.

The translation assistance system 10 can access a database through a communication network such as the Internet or an intranet. The database is a functional element or device that stores a set of data so as to respond to a given data operation (e.g., extraction, addition, deletion, overwriting etc.) from a processor or an external computer. The database may be implemented in any way, and a database management system (DBMS) may be used, or a text file may function as a database, for example. In this embodiment, the translation assistance system 10 can access a target source text database 21, a target translation database 22, a reference text database 23, and a dictionary database 24 shown in FIG. 2.

Locations where the target source text database 21, the target translation database 22, the reference text database 23 and the dictionary database 24 are placed are not particularly limited. In this embodiment, those databases are different devices from the translation assistance system 10. However, at least one database may be built in a computer that constitutes the translation assistance system 10. Alternatively, at least one database may be placed in a computer system that is independent of the translation assistance system 10. The four databases may be managed by the same entity or different entities.

The target source text database 21 is a database that stores one or more target source texts, and it stores a large number of target source texts, for example. The "target source text" is a text that is written in a source language, which is a text before being translated. The source language is the original language in translation. The "text" is a sequence of languages representing a unified content. The composition of a text is not limited in any way, and a text may contain a subject and a predicate, or may be a string of nouns, for example.

The target translation database 22 is a database that stores one or more target translated texts, and it stores a large number of target translated texts, for example. The "target translated text" is a text that is obtained by translating and writing a target source text in a target language. Accordingly, one target translated text corresponds to one target source text. The translation assistance system 10 evaluates the adequacy of the target translated text.

Each target source text in the target source text database 21 and each target translated text in the target translation database 22 are associated with each other in advance and, with this link, the translation assistance system 10 gets to know which target source text is translated and how it is translated. A method of associating the target source text and the target translated text is not limited. For example, a correspondence table between the target source text and the target translated text may be used, or a webpage on which the target source text is written and a webpage on which the target translated text is written may be connected by a hyperlink. Because the target source text and the target translated text are associated in this manner, it is possible to use a set of the target source text and the target translated text as a parallel corpus in form unless the quality of the target translated text is taken into consideration.

The reference text database 23 is a database that stores one or more reference texts, and it stores a large number of reference texts, for example. Each reference text is written in a target language. The reference text is not necessarily a translation of a certain text, and it may be a text that is originally written in a target language, regardless of a text in a different language. A part or the whole of the reference text is a text that is independent of the target source text. Although a part of one or more reference texts may be a correct translation of the target translated text, at least a part of the reference text is independent of the target source text. The "text that is independent of the target source text" is a text that is generated irrespectively of the target source text or a text that is not depending on the target source text. The reference text that is independent of the target source text is not a text which is a translation of the target source text into the target language, and it is thus not a correct translation of the target source text. The reference text is, in other words, an external information source, which is different from the target source text and the target translated text.

The reference text is a text written by a native speaker of the target language or a person who reaches a certain level of language skills in the target language, for example. Therefore, the reference text is a text written using natural expressions and wording when read by those who understand the target language. It should be noted that the term "correct translation" in this specification means that the translation is not wrong as an expression in the target language, and it does not deny the existence of other expressions.

On the other hand, the target translated text whose adequacy is to be evaluated is sometimes written by machine translation (automatic translation service) or a person who does not reach a certain level of language skills in the target language, for example. Therefore, there is a possibility that the target translated text contains an incorrect translation or contains expressions or wording that causes a feeling of strangeness to a person who understands the target language. On the other hand, some of the target translated texts are translated appropriately. Thus, the quality of the target translated text differs largely depending on the text. The translation assistance system 10 evaluates the expressions or wording of each target translated text by using, as clues, the reference text that is written using natural expressions and wording and independent of the target translated text.

The source language and the target language are different from each other as a matter of course. The source language and the target language are not limited in any way, and therefore the translation assistance system 10 can select the source language and the target language from a large number of languages existing in the world. In this embodiment, it is assumed that the source language is Japanese and the target language is English.

The content of the target source text and the target translated text is not particularly limited, and the content of the reference text is also not particularly limited. Because the reference text is independent of the target source text and the target translated text, the category to which the reference text belongs may be not related to or may correspond to the category to which the target translated text belongs. The category of a text is classification based on the content of the text. When two categories correspond, the both categories are the same, one includes the other, or the both indicate a common area. Each of the target source text, the target translated text and the reference text may be prestored in a database in the state where the category of the text is associated with each of those texts.

For example, the target source text database 21 may store, as the target source text, a product title in Japanese to be shown on a first electronic commerce site (EC site) designed for Japan. In this case, the target translation database 22 stores, as the target translated text, a product title translated into English to be shown on an English version of the first EC site. The reference text database 23 may store, as the reference text, an arbitrary English text created in the English-speaking world, and it may store another product title (e.g., a product title on a second EC site) which is independent of the product title on the first EC site and written in English, for example. Alternatively, the reference text database 23 may store, as the reference text, a text which is totally different in type from the product title (e.g., a news article, a text extracted from blogs etc.).

In the case where all of the target source text, the target translated text and the reference text are product titles on EC sites, the translation assistance system 10 may process those texts, regarding their categories as corresponding to one another. Alternatively, the translation assistance system 10 may process each text based on the category of each product for each of the first EC site and the second EC site. For example, the translation assistance system 10 may determine that categories are different between the product title of a rice cooker belonging to the category "rice cooker" and the product title of a fountain pen belonging to the category "stationery".

In any event, a correct translation for a translated text to be evaluated does not actually exist in many cases. For a person who prepares the target translated text, it is generally difficult to create a correct translation for the target translated text on one's own or ask someone for the correct translation, and it is not possible to rely on a correct translation of a text to be evaluated as in the related art. Particularly, it is difficult to apply such an evaluation technique according to the related art in the case where there are a large number of translated texts to be evaluated, such as product titles on EC sites. In view of the foregoing, the translation assistance system 10 evaluates the adequacy of the target translated text by using, as the reference text, an existing text that is written in the target language and independent of the target source text (and the target translated text).

The dictionary database 24 is a database that stores dictionary data indicating the correspondence between the source language and the target language, which is a translation dictionary. Each record in the dictionary data contains a pair of a word or phrase written in the source language and a correct word or phrase written in the target language (i.e., a correct translation). Alternatively, each record may contain a set of a word or phrase written in the source language, an incorrect word or phrase written in the target language (i.e., an incorrect translation), and a correct word or phrase written in the target language (i.e., a correct translation). The dictionary database 24 may be utilized by an automatic translation service (not shown).

Figure 2:
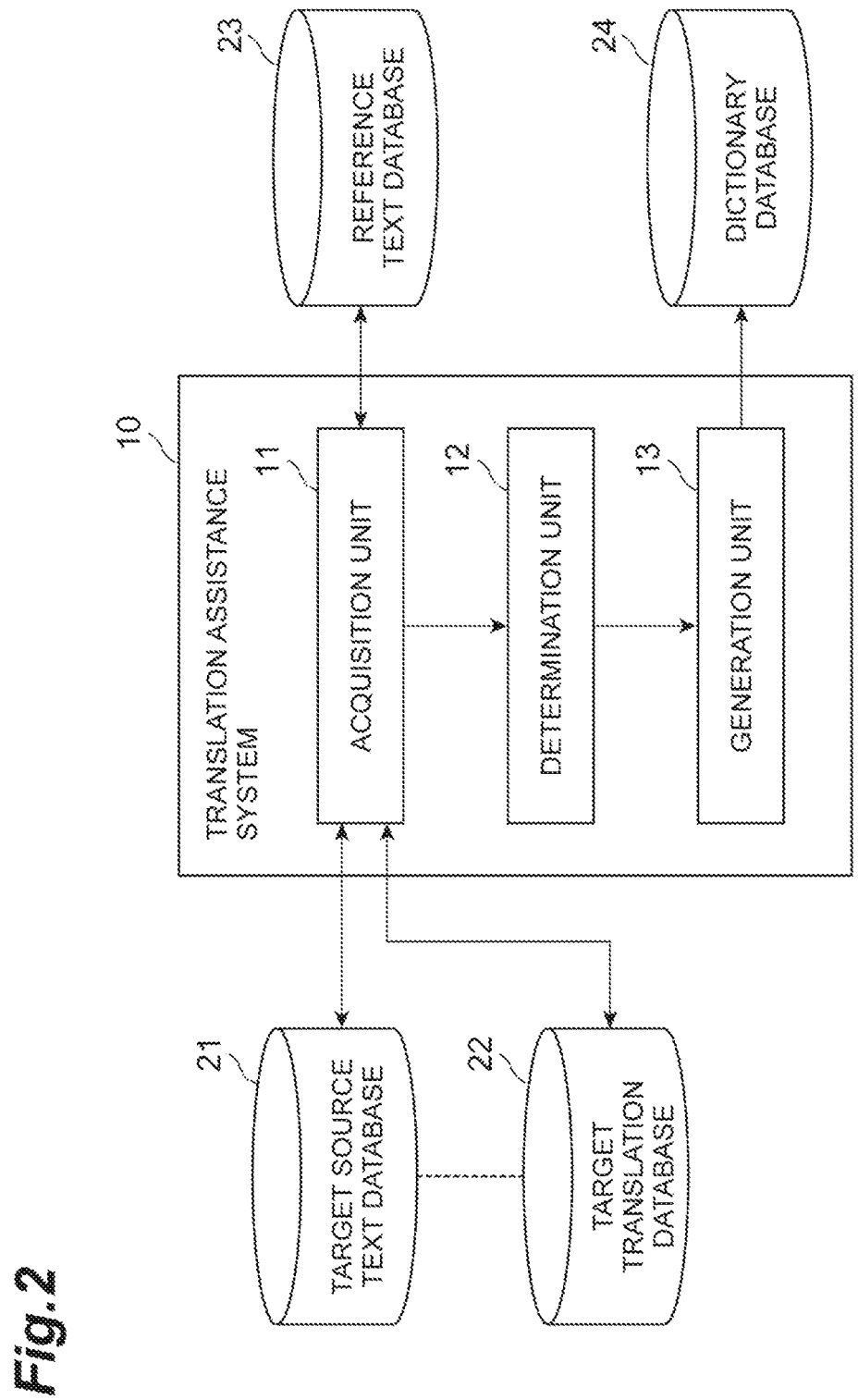
FIG. 2 is a view showing the functional configuration of the translation assistance system according to the embodiment.

FIG. 2 shows the functional configuration of the translation assistance system 10. The translation assistance system 10 includes an acquisition unit 11, a determination unit 12, and a generation unit 13 as functional elements.

The acquisition unit 11 is a functional element that acquires a target translated text and a correct word set. The acquisition unit 11 accesses the target translation database 22 and reads at least one target translated text. Further, the acquisition unit 11 accesses the target source text database 21 and reads at least one target source text corresponding to the target translated text. Furthermore, the acquisition unit 11 accesses the reference text database 23 and reads one or more (e.g., a plurality of) reference texts.

When acquiring a plurality of target translated texts and a plurality of target source texts, the acquisition unit 11 may read the target translated texts and the target source texts in the same category. In this case, the acquisition unit 11 may read only one or more reference texts belonging to the same category as the target translated texts. In the case where the category is associated with each of the target source text, the target translated text and the reference text in each database, the acquisition unit 11 may acquire the reference text that belongs to the same category as the target translated text read. Alternatively, the acquisition unit 11 may compare one or more word n-grams that form the target translated text and one or more word n-grams (correct word set, which is described later) that form the reference text, and acquire the reference text where the degree of matching in the word n-gram with the target translated text is equal to or higher than a predetermined threshold, as the reference text belonging to the same category. In this manner, the acquisition unit 11 may have a function as an extraction unit that analyzes a plurality of reference texts and extracts the reference text that belongs to the same category as the target translated text based on the degree of matching between a word contained in each reference text and a word contained in the target translated text. The word n-gram is described later.

Alternatively, the acquisition unit 11 may read a plurality of target translated texts and a plurality of target source texts regardless of the category. Further, the acquisition unit 11 may read one or more reference texts regardless of the category. Specifically, the acquisition unit 11 may read one or more reference texts from the reference text database 23 regardless of whether or not the category is the same between the target translated text and the reference text.

Then, the acquisition unit 11 creates a word n-gram from the acquired one or more reference texts. The "word n-gram" is a contiguous sequence of one or more words obtained by dividing a text into segments of n number of words each. In this embodiment, n=1, 2, 3, and therefore the translation assistance system 10 handles a word unigram, a word bigram, and a word trigram. In the case where the target language has uppercase and lowercase letters, the acquisition unit 11 converts the reference text into lowercase letters. The acquisition unit 11 then divides the reference text into one or more words and acquires a contiguous sequence of words, and generates a word n-gram (n=1, 2, 3) based on this sequence. The acquisition unit 11 generates a word n-gram (n=1, 2, 3) from each reference text. In this specification, the word n-gram that is obtained from the reference text is referred to also as "reference word n-gram", and a set of reference word n-grams is referred to as a "correct word set".

A method of word segmentation is known. For example, if a text is written in English, the acquisition unit 11 can obtain one or more words by separating the text at each blank space, and if a text is written in Japanese, the acquisition unit 11 can obtain one or more words by morphological analysis using a dictionary such as "ipadic". Further, the acquisition unit 11 may separate a text such that a plurality of co-occurring words (e.g., two words, three words) are in one unit.

Likewise, the acquisition unit 11 generates a set of word n-grams (n=1, 2, 3) from each of the target translated text and the target source text. In this specification, the word n-gram that is obtained from the target source text is referred to also as "source word n-gram", and the word n-gram that is obtained from the target translated text is referred to also as "translated word n-gram". The acquisition unit 11 generates a pair of a set of word n-grams obtained from one target source text and a set of word n-grams obtained from one target translated text corresponding to the target source text. In this specification, this pair is referred to also as an "target translation pair", and a set of target translation pairs is referred to as a "data set".

The acquisition unit 11 obtains the following data by the above processing, and outputs the data to the determination unit 12.

reference word n-gram set (correct word set): $U=\{u_1, \ldots, u_M\}$
source word n-gram set of each target source text: $t_k$
translated word n-gram set of each target translated text: $\hat{t}_k$ A set of target translation pairs, which is a data set D, is represented as:

$$D=\{\langle t_k, \hat{t}_k \rangle\}_{k=0}^{K}$$

A word unigram contained in the correct word set is a word that forms the reference text, and a word bigram and a word trigram contained in the correct word set is a phrase that forms the reference text (a unit of expression consisting of a plurality of words). A word unigram contained in the target source text is a word that forms the target source text, and a word bigram and a word trigram contained in the target source text is a phrase that forms the target source text. A word unigram contained in the target translated text is a word that forms the target translated text, and a word bigram and a word trigram contained in the target translated text is a phrase that forms the target translated text The acquisition unit 11 may remove stop words from the source word n-gram set and the translated word n-gram set and then output the data sets to the determination unit 12. By removing the stop words in advance, the amount of data sets related to the target translated text decreases, and it is thereby possible to reduce the consumption of hardware resources (e.g., a processor and a memory) and increase the processing speed. The expressions specified as the stop words are not limited, and they may be a symbol, a special character, an expression containing a number (e.g., a model number of a product) and the like, for example.

The determination unit 12 is a functional element that calculates the degree of matching between one or more translated word n-grams that form the target translated text and the correct word set, and determines the adequacy of the target translated text based on the degree of matching. The degree of matching is the degree indicating how closely a word or phrase that forms the target translated text matches a word or phrase in the correct word set. The determination unit performs the following processing for each target translated text.

The determination unit 12 calculates the number $c_n(\hat{t}_k)$ of n-grams in the target translated text by the following equation (1), where $\|\hat{t}_k\|$ indicates the number of words that form the target translated text.

$$c_n(\hat{t}_k)=\|\hat{t}_k\|-n+1 \quad (1)$$

Next, the determination unit 12 examines the matching between each translated word n-gram in the target translated text and the correct word set U for each of the word n-grams (n=1, 2, 3) (i.e., for each of the word unigram, the word bigram and the word trigram), and calculates the number $h_n(\hat{t}_k, U)$ of matching word n-grams by the following equation (2). This number is referred to also as the number of n-gram matches.

$$h_n(\hat{t}_k, U) = \sum_x \min(c(\hat{t}_k, x), c(U, x)) \quad (2)$$

In the above equation, x indicates the word n-gram. $c(\hat{t}_k, x)$ indicates the number of appearances of x in the translated word n-gram set $\hat{t}_k$, and $c(U,x)$ indicates the number of appearances of x in the correct word set U.

Then, the determination unit 12 calculates the n-gram matching rate $a_n(\hat{t}_k, U)$ of the translated word n-gram set $\hat{t}_k$ for each of the word n-grams (n=1, 2, 3) by the following equation (3). The n-gram matching rate is the proportion of the translated word n-gram that matches the reference word n-gram in the correct word set among the translated word n-grams that form the target translated text.

$$a_n(\hat{t}_k, U) = \frac{h_n(\hat{t}_k, U)}{c_n(\hat{t}_k)} \quad (3)$$

After that, the determination unit 12 calculates the sum of the matching rates of the word n-grams (n=1, 2, 3), each multiplied by a specified weight, as a final score. Specifically, the determination unit 12 calculates the score by the following equation (4). This score is an example of a numerical value indicating the degree of matching.

$$\text{Score}=\alpha a_1(\hat{t}_k, U)+\beta a_2(\hat{t}_k, U)+\gamma a_3(\hat{t}_k, U) \quad (4)$$

In the above equation, the matching rates $a_1$, $a_2$ and $a_3$ are a first matching rate (matching rate in word unigram), a second matching rate (matching rate in word bigram), and a third matching rate (matching rate in word trigram), respectively. Further, $\alpha$, $\beta$ and $\gamma$ are a first weight, a second weight, and a third weight, respectively.

Although the values of $\alpha$, $\beta$ and $\gamma$ are not limited, those weights may be set to satisfy $\alpha<\beta<\gamma$, for example. This is because the quality of a translation is higher when phrases match (a sequence of a plurality of words match) than merely when words match. For example, $\alpha$, $\beta$ and $\gamma$ may be set as: $\alpha=2$, $\beta=5$ and $\gamma=7$ experientially.

The determination unit 12 compares the calculated score with a predetermined threshold, and determines that the target translated text is adequate when the score is equal to or higher than the threshold, and determines that the target translated text is inadequate when the score is lower than the threshold. "The target translated text is adequate" means that the target translated text meets a certain level of correctness in terms of meaning and expression as a translation of the target source text. "The target translated text is inadequate" means that the target translated text does not reach the certain level of correctness.

One significance of the determination based on the degree of matching of the word n-gram is to place greater importance on whether an appropriate word or phrase is used than on the overall fluency or grammatical accuracy of a translated text. Because the determination unit 12 determines the adequacy of a translated text based simply on the degree of matching of the word n-gram without taking grammar into account, the processing is easy, and the processing load on a computer is low. On the other hand, because the accuracy of a word or phrase has a greater effect on impression on a translated text than the accuracy of grammar, it is efficient to determine the adequacy of a translated text based on the accuracy of a word or phrase. Therefore, the translation assistance system 10 can evaluate the adequacy of a translated text efficiently with lower processing load on a computer.

The determination unit 12 passes a processing result for each target translated text to the generation unit 13. The determination unit 12 may further output an evaluation result by an arbitrary method. For example, the determination unit 12 may display an evaluation result on a monitor, store it into a specified database, or transmit it to another computer or computer system. The determination unit 12 may output an evaluation result of all the target translated texts processed or may output an evaluation result of only the target translated texts determined to be inadequate. A user refers to the evaluation result and can thereby easily find the target translated text that needs to be corrected.

The generation unit 13 is a functional element that generates dictionary data indicating correct translations between the source language and the target language, and stores the dictionary data into the dictionary database 24.

One factor that reduces the evaluation of the target translated text is that expressions (words or phrases) are specific to the category of a text (depend on the category of a text), and machine translation (automatic translation service) does not cover the expressions. One typical example is shown in the following Table 1.

TABLE 1

| | Word or Phrase |
|---|---|
| Word in Source Text (Japanese) | "象印" (Registered Trademark) |
| Incorrect Translation (English) | "elephant seal" ("象"→"elephant", "印"→"seal") "elephant marked" ("象"→"elephant", "印"→"marked") |
| Correct Translation (English) | "ZOJIRUSHI" (Registered Trademark) |

The Japanese word in Table 1 is a proper noun indicating an abbreviated or popular name for a company, which consists of two Kanji characters. This word should be translated into "ZOJIRUSHI" in English. However, incorrect translations as shown in Table 1 can occur due to the reason that a dictionary in machine translation (automatic translation service) does not cover this proper noun. The two incorrect translations shown in Table 1 both occur because each of the two Kanji characters has a meaning alone and therefore they are translated separately. The generation unit 13 generates dictionary data by associating a word or phrase in the source text translated incorrectly with a correct translation. By referring to the dictionary database 24 in which the dictionary data is accumulated, it is possible to raise the accuracy of translations.

The generation unit 13 acquires an incorrect translated word n-gram from one or more target translated texts determined to be inadequate by the determination unit 12. In order to improve the overall quality of translations, the generation unit 13 may focus attention on a word n-gram that appears frequently among the word n-grams that form a poorly evaluated target translated text. The generation unit 13 executes the following processing and thereby acquires the word n-gram with high frequency of appearance as the incorrect translated word n-gram.

To be specific, the generation unit 13 extracts a word unigram that does not match the correct word set among the word unigrams (i.e., words) that form the target translated text. The generation unit 13 may remove stop words from the extracted word group. By removing the stop words in advance, the amount of words to be processed decreases, and it is thereby possible to reduce the consumption of hardware resources (e.g., a processor and a memory) and increase the processing speed. The expressions specified as the stop words are not limited as described above. Then, the generation unit 13 selects, from the extracted words, a word whose number of appearances is equal to or higher than a predetermined threshold.

Then, the generation unit 13 extracts a word bigram and a word trigram containing the selected word from a data set (the word n-gram set of one or more target translated texts). It is difficult to determine, from the word (word unigram) alone, whether it is a correct or incorrect translation. Thus, the generation unit 13 determines whether the word n-gram is an incorrect translation or not by taking the word bigram and the word trigram containing this word into consideration (i.e., by taking a phrase into consideration).

The generation unit 13 calculates pointwise mutual information (PMI) for each of the word bigram and the word trigram extracted as above. When the translated word n-gram is a bigram, the generation unit 13 calculates PMI by the following equation (5), and when the translated word n-gram is a trigram, the generation unit 13 calculates PMI by the following equation (6).

$$PMI(x, y) = \log_2 \frac{P(x, y)}{P(x)P(y)} \quad (5)$$

$$PMI(x, y, z) = \log_2 \frac{P(x, y, z)}{P(x)P(y)P(z) + P(x)P(y, z) + P(x, y)P(z)} \quad (6)$$

In the above equations, P(x), P(y) and P(z) indicate the probability of appearance of the word x in a text, the probability of appearance of the word y in a text, and the probability of appearance of the word z in a text, respectively. P(x, y) is the probability of appearance of a sequence of the words x and y in a text, P(y, z) is the probability of appearance of a sequence of the words y and z in a text, and P(x, y, z) is the probability of appearance of a sequence of the words x, y and z in a text.

The generation unit 13 acquires the word bigram or the word trigram whose PMI is equal to or higher than a predetermined threshold (i.e., phrase whose PMI is equal to or higher than a predetermined threshold) as the incorrect translated word n-gram (n=2, 3).

After that, the generation unit 13 determines an incorrect translation pair for each incorrect translated word n-gram and further determines a correct translation pair. An incorrect translation contained in the target translated text is a result of translating a certain expression (word or phrase) in the target source text; however, it is unclear which part of the text is an incorrect translation at this time. The generation unit 13 identifies the source word n-gram corresponding to the incorrect translated word n-gram and estimates a correct translation of the source word n-gram and thereby finds the correct correspondence between a word or phrase in the source language and a word or phrase in the target language. Some target translated texts are incorrect translations, and other target translated texts are correct translations (appropriate translations). For example, a set of target translated texts can include both of a text obtained by machine translation and a text translated appropriately by a person. Thus, there are cases where an expression in the target source text is translated incorrectly (i.e., incorrect translation) and cases where it is translated correctly, and those two types of translations are considered not to appear simultaneously in one target translated text. Thus, the generation unit 13 separates the data set D, which is a set of target translation pairs, into the following two groups $D'_{ej}$ and $D''_{ej}$.

$$D'_{ej}(\{\langle t_k, \hat{t}_k \rangle\}_{k=0}^K | \hat{u}_i \in \hat{t}_k)$$

$$D''_{ej}(\{\langle t_k, \hat{t}_k \rangle\}_{k=0}^K | \hat{u}_i \notin \hat{t}_k)$$

The group $D'_{ej}$ is a set of target translation pairs containing the incorrect translated word n-gram ($\hat{u}_i$), and the group $D''_e$ is a set of target translation pairs not containing the incorrect translated word n-gram.

Then, the generation unit 13 calculates a chi-square value ($\chi^2$) for all the source word n-grams that form the source word n-gram set $t_k=(u_1, \ldots, u_J)$ in the group $D'_{ej}$. Although a method of calculating the chi-square value is not limited, the generation unit 13 may calculate the chi-square value by the following equation (7), for example.

$$\chi^2 = \frac{n(ad - bc)^2}{(a+b)(c+d)(a+c)(b+d)} \quad (7)$$

The meaning of variables a, b, c, d and n is as follows.

a: the number of target translation pairs containing the source word n-gram ($u_j$) in the target source text and containing the incorrect translated word n-gram ($\hat{u}_i$) in the target translated text.

b: the number of target translation pairs containing the source word n-gram ($u_j$) in the target source text and not containing the incorrect translated word n-gram ($\hat{u}_i$) in the target translated text.

c: the number of target translation pairs not containing the source word n-gram ($u_j$) in the target source text and containing the incorrect translated word n-gram ($\hat{u}_i$) in the target translated text.

d: the number of target translation pairs not containing the source word n-gram ($u_j$) in the target source text and not containing the incorrect translated word n-gram ($\hat{u}_i$) in the target translated text.

n: the total number of target translation pairs, where n=a+b+c+d.

The relationship of the variables a to d is shown in the following Table 2.

TABLE 2

|  | Contain $\hat{u}_i$ | Not Contain $\hat{u}_i$ |
|---|---|---|
| Contain $u_j$ | a | b |
| Not Contain $u_j$ | c | d |

The generation unit 13 calculates the chi-square value between a certain incorrect translated word n-gram and each source word n-gram in the target source text, and determines one source word n-gram corresponding to the incorrect translated word n-gram based on the chi-square value. The correspondence between the incorrect translated word n-gram and the source word n-gram is referred to as an "incorrect translation pair".

The generation unit 13 may determine the incorrect translation pair semi-automatically. To be specific, the generation unit 13 arranges the source word n-grams in descending order of the chi-square value and transmits the top m number of source word n-grams to a user terminal (not shown). The generation unit 13 then associates one source word n-gram selected by the user terminal in response to the transmission and sent back to the translation assistance system 10 with the incorrect translated word n-gram and thereby determines the incorrect translation pair. Alternatively, the generation unit 13 may associate the source word n-gram having the largest chi-square value with the incorrect translated word n-gram and thereby determine the incorrect translation pair automatically. The fact that a certain source word n-gram has a large chi-square value means that this source word n-gram appears characteristically in the data set containing the incorrect translated word n-gram, and therefore the incorrect translated word n-gram and the source word n-gram are likely to correspond to each other.

After obtaining the incorrect translation pair, the generation unit 13 obtains the translated word n-gram that is estimated as a correct translation of the source word n-gram that forms this pair. To be specific, the generation unit 13 separates the data set D, which is a set of target translation pairs, into the following two groups $D'_{je}$ and $D''_{je}$.

$$D'_{je}(\{\langle t_k, \hat{t}_k \rangle\}_{k=0}^K | \hat{u}_j \in \hat{t}_k)$$

$$D''_{je}(\{\langle t_k, \hat{t}_k \rangle\}_{k=0}^K | \hat{u}_j \notin \hat{t}_k)$$

The group $D'_{je}$ is a set of target translation pairs containing the source word n-gram ($u_j$), and the group $D''_{je}$ is a set of target translation pairs not containing this source word n-gram.

Then, the generation unit 13 calculates a chi-square value ($\chi^2$) for all the translated word n-grams that form the translated word n-gram set $\hat{t}_k = (\hat{u}_1, \ldots, \hat{u}_I)$ in the group $D'_{je}$ by the above equation (7). The meaning of variables a, b, c, d and n in this calculation is as follows, and the relationship of the variables a to d is the same as shown in the above Table 2.

a: the number of target translation pairs containing the translated word n-gram ($\hat{u}_i$) in the target translated text and containing the source word n-gram ($u_j$) in the target source text.

b: the number of target translation pairs containing the translated word n-gram ($\hat{u}_i$) in the target translated text and not containing the source word n-gram ($u_j$) in the target source text.

c: the number of target translation pairs not containing the translated word n-gram ($\hat{u}_i$) in the target translated text and containing the source word n-gram ($u_j$) in the target source text.

d: the number of target translation pairs not containing the translated word n-gram ($\hat{u}_i$) in the target translated text and not containing the source word n-gram ($u_j$) in the target source text.

n: the total number of target translation pairs, where n=a+b+c+d.

The generation unit 13 calculates the chi-square value between a certain source word n-gram and each translated word n-gram in the target translated text, and determines one translated word n-gram corresponding to the source word n-gram based on the chi-square value. The correspondence between the source word n-gram and the translated word n-gram is referred to as a "correct translation pair".

The generation unit 13 may determine the correct translation pair semi-automatically. To be specific, the generation unit 13 arranges the translated word n-grams in descending order of the chi-square value and transmits the top m' number of translated word n-grams to a user terminal (not shown). The generation unit 13 then associates one translated word n-gram selected by the user terminal in response to the transmission and sent back to the translation assistance system 10 with the source word n-gram and thereby determines the correct translation pair. Alternatively, the generation unit 13 may associate the translated word n-gram having the largest chi-square value with the source word n-gram and thereby determine the correct translation pair automatically. The fact that a certain translated word n-gram has a large chi-square value means that the translated word n-gram appears characteristically in the data set containing the source word n-gram, and the source word n-gram and the translated word n-gram are likely to correspond to each other.

By the above processing, the generation unit 13 obtains a set of the incorrect translated word n-gram, the source word n-gram, and the translated word n-gram that is estimated as a correct translation. Alternatively, the generation unit 13 obtains a set of the source word n-gram and the translated word n-gram that is estimated as a correct translation. The above processing is one example of processing of determining, from one or more pairs containing an incorrect translated word n-gram, one source word n-gram based on the degree of co-appearance with this incorrect translated word n-gram, and then determining, from one or more pairs containing this source word n-gram, one correct translated word n-gram based on the degree of co-appearance with this source word n-gram. In this embodiment, the degree of co-appearance of a certain source word n-gram with an incorrect translated word n-gram and the degree of co-appearance of a certain translated word n-gram with a source word n-gram are both calculated by the chi-square value. However, a method of calculating those degrees is not limited to the chi-square value.

The generation unit 13 stores the acquired set as a record of the dictionary data into the dictionary database 24. As a result, the dictionary data regarding expressions which a person or a computer that has created the target translated text has been unable to handle is obtained.

[System Operation]

Hereinafter, the operation of the translation assistance system 10 and a translation assistance method according to this embodiment are described with reference to FIGS. 3 to 9.

Figure 3:
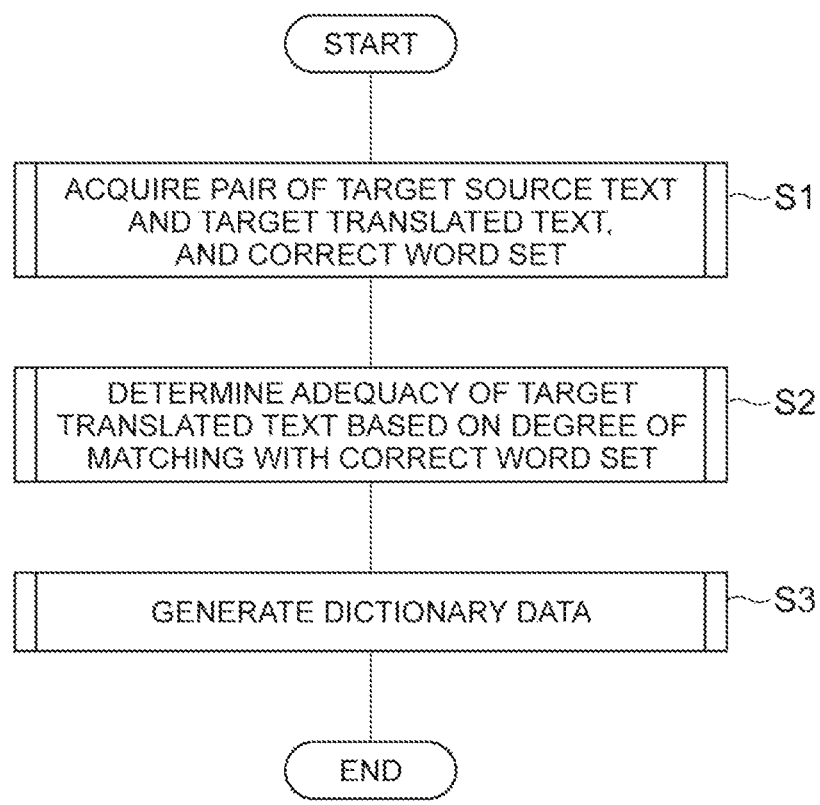
FIG. 3 is a flowchart showing the operation of the translation assistance system according to the embodiment.

FIG. 3 is a flowchart showing the overall operation of the translation assistance system 10. As shown in this figure, the translation assistance system 10 first acquires a pair (data set) of a target source text and a target translated text and further acquires a correct word set (Step S1, acquisition step). Next, the translation assistance system 10 determines the adequacy of the target translated text based on the degree of matching with the correct word set (Step S2, determination step). Further, the translation assistance system 10 generates dictionary data indicating the correct correspondence between the source language and the target language (Step S3, generation step).

Figure 4:
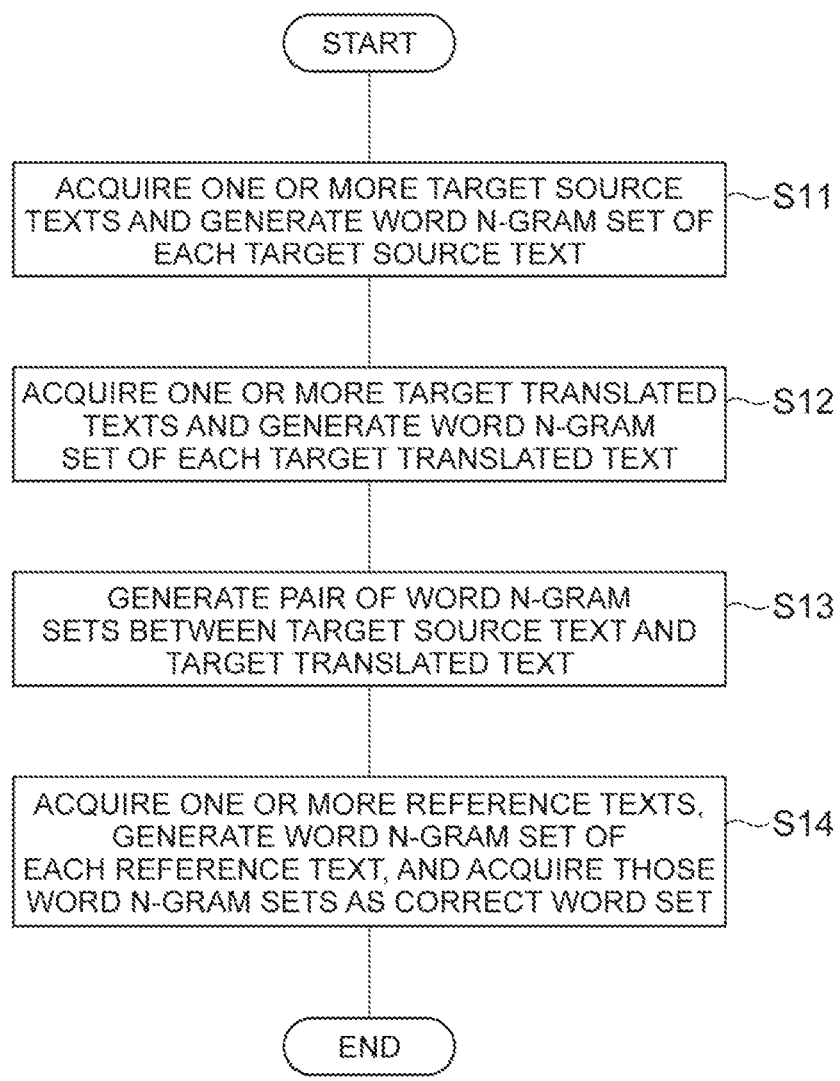
FIG. 4 is a flowchart showing the details of processing of acquiring data.

FIG. 4 is a flowchart showing the details of processing of acquiring data (Step S1). In Step S1, the acquisition unit 11 acquires one or more target source texts from the target source text database 21, and generates a word n-gram set of each target source text (source word n-gram set) (Step S11). Further, the acquisition unit 11 acquires one or more target translated texts from the target translation database 22, and generates a word n-gram set of each target translated text (translated word n-gram set) (Step S12). Then, the acquisition unit 11 generates a pair of word n-gram sets between the target source text and the target translated text (target translation pair) (Step S13). Further, the acquisition unit 11 acquires one or more reference texts from the reference text database 23, generates a word n-gram set of each reference text (reference word n-gram set), and acquires those reference word n-gram sets as the correct word set (Step S14).

Figure 5:
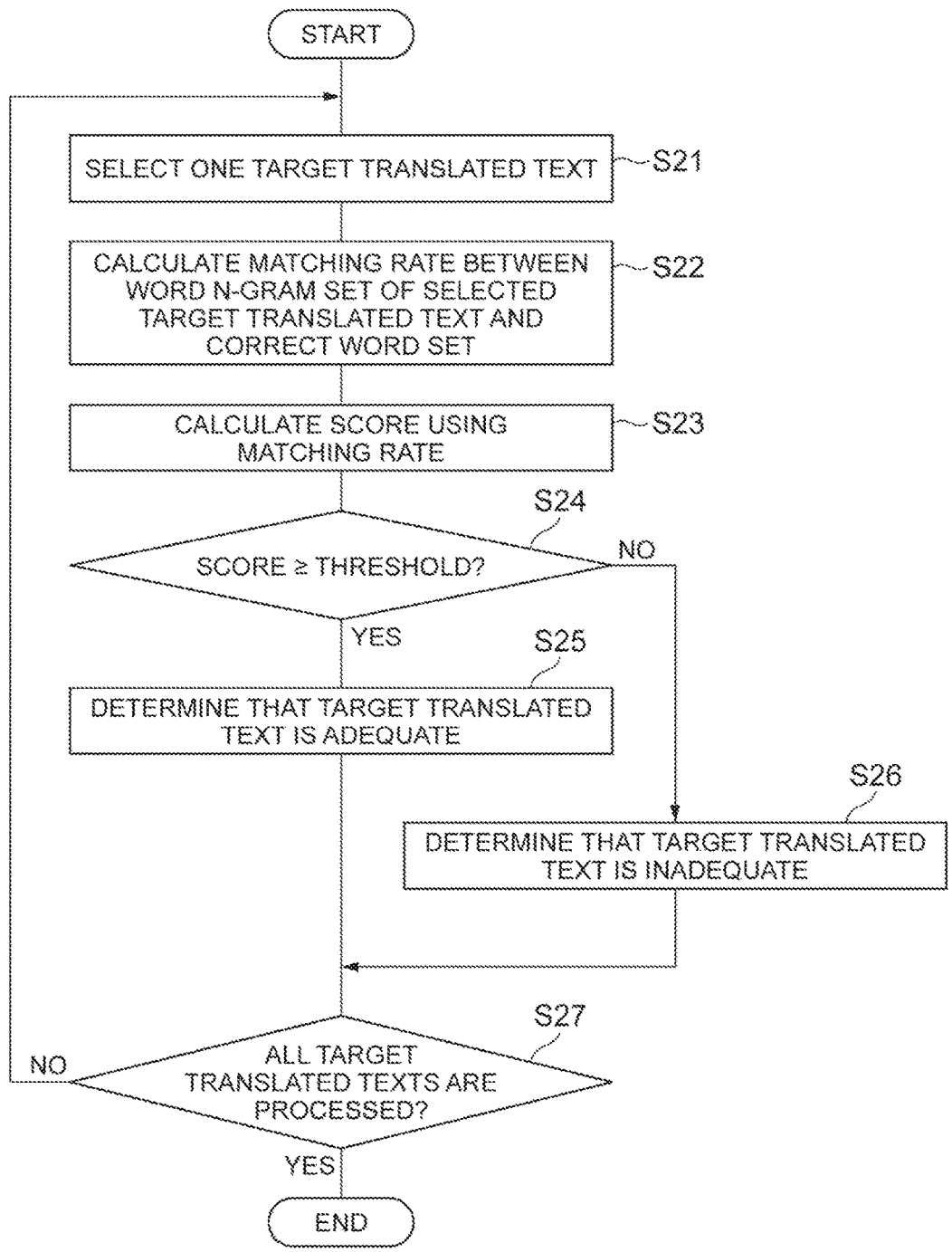
FIG. 5 is a flowchart showing the details of processing of determining the adequacy of a translation.

The process shown in FIG. 5 is described next. FIG. 5 is a flowchart showing the details of processing of determining the adequacy of a translation (Step S2). In Step S2, the determination unit 12 selects one target translated text (Step S21), and calculates the matching rate between the word n-gram set of the target translated text and the correct word set (Step S22). The determination unit 12 calculates the matching rate for each of the word unigram, the word bigram and the word trigram (i.e., n=1, 2, 3).

Next, by using the matching rate, the determination unit 12 calculates a score indicating the degree of matching between the translated word n-gram set and the correct word set (Step S23). Then, the determination unit 12 compares this score with a predetermined threshold (Step S24). When the score is equal to or higher than the threshold (Yes in Step S24), the determination unit 12 determines that the target translated text is adequate (Step S25), and when the score is lower than the threshold (No in Step S24), the determination unit 12 determines that the target translated text is not adequate (Step S26). As a result, an evaluation result regarding the adequacy of one target translated text is obtained.

The determination unit 12 performs the processing of Steps S21 to S26 for all the target translated texts to be evaluated (see Step S27).

Figure 6:
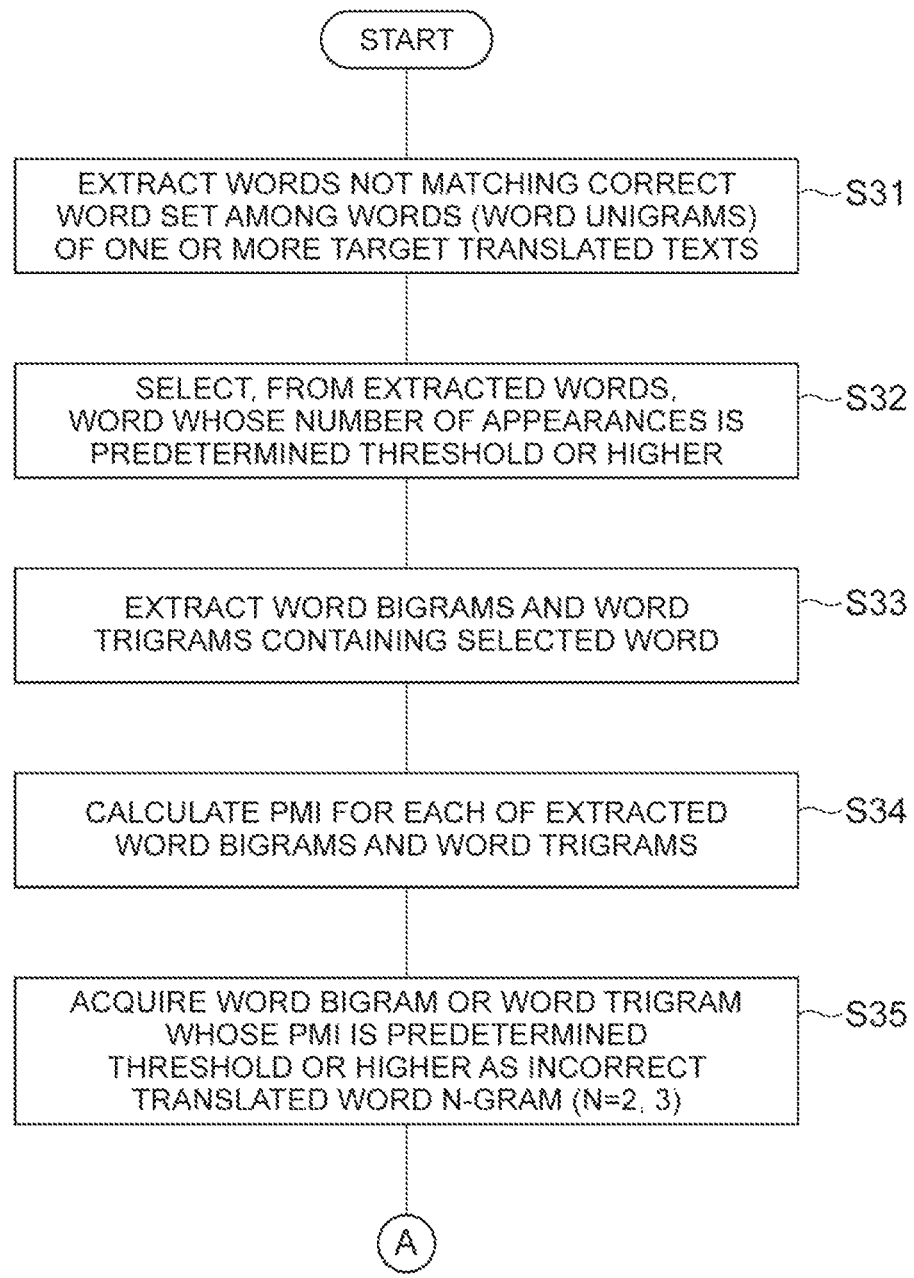
FIG. 6 is a flowchart showing the details of processing of generating dictionary data.
Figure 7:
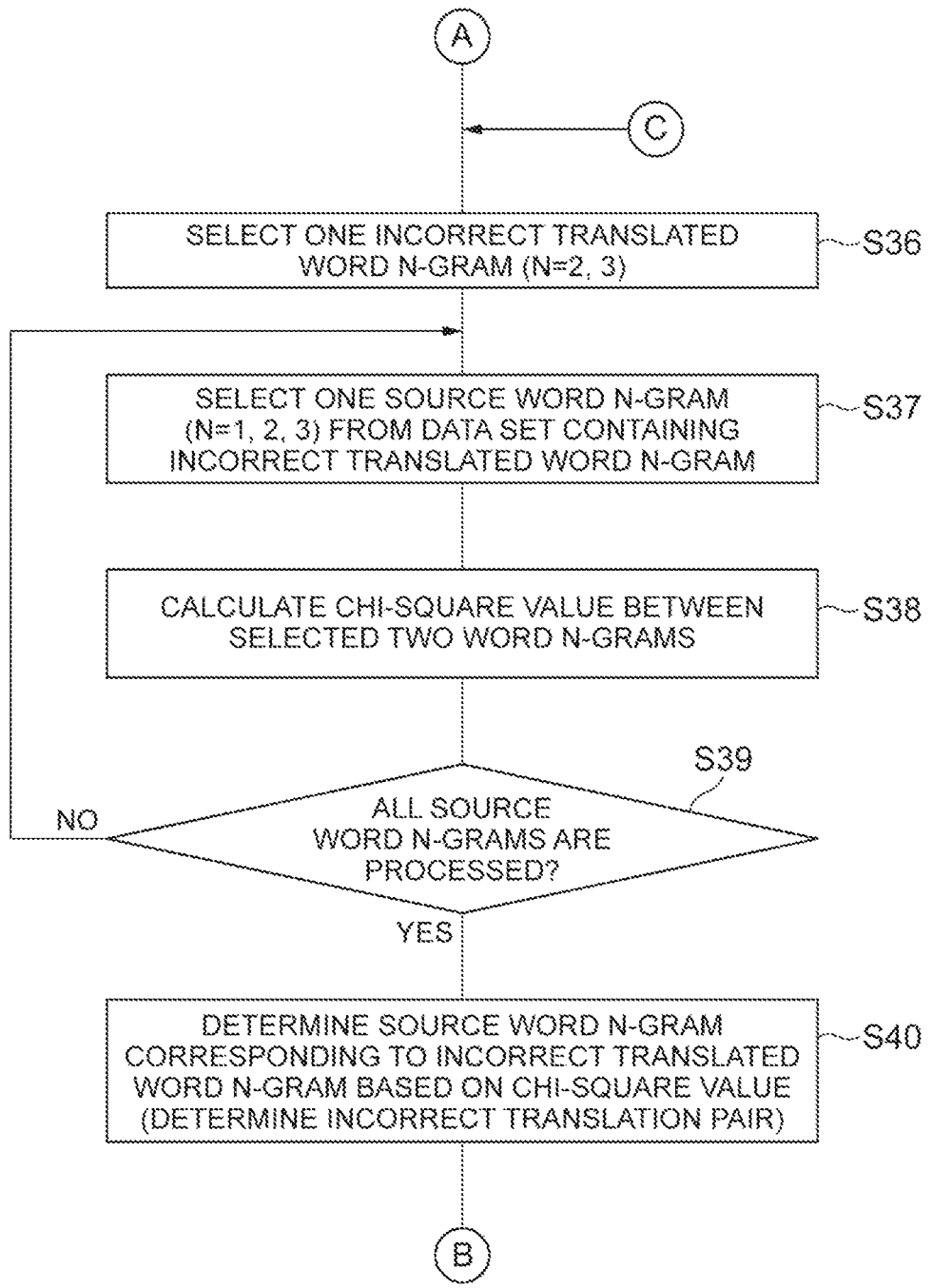
FIG. 7 is a flowchart showing the details of processing of generating dictionary data.
Figure 8:
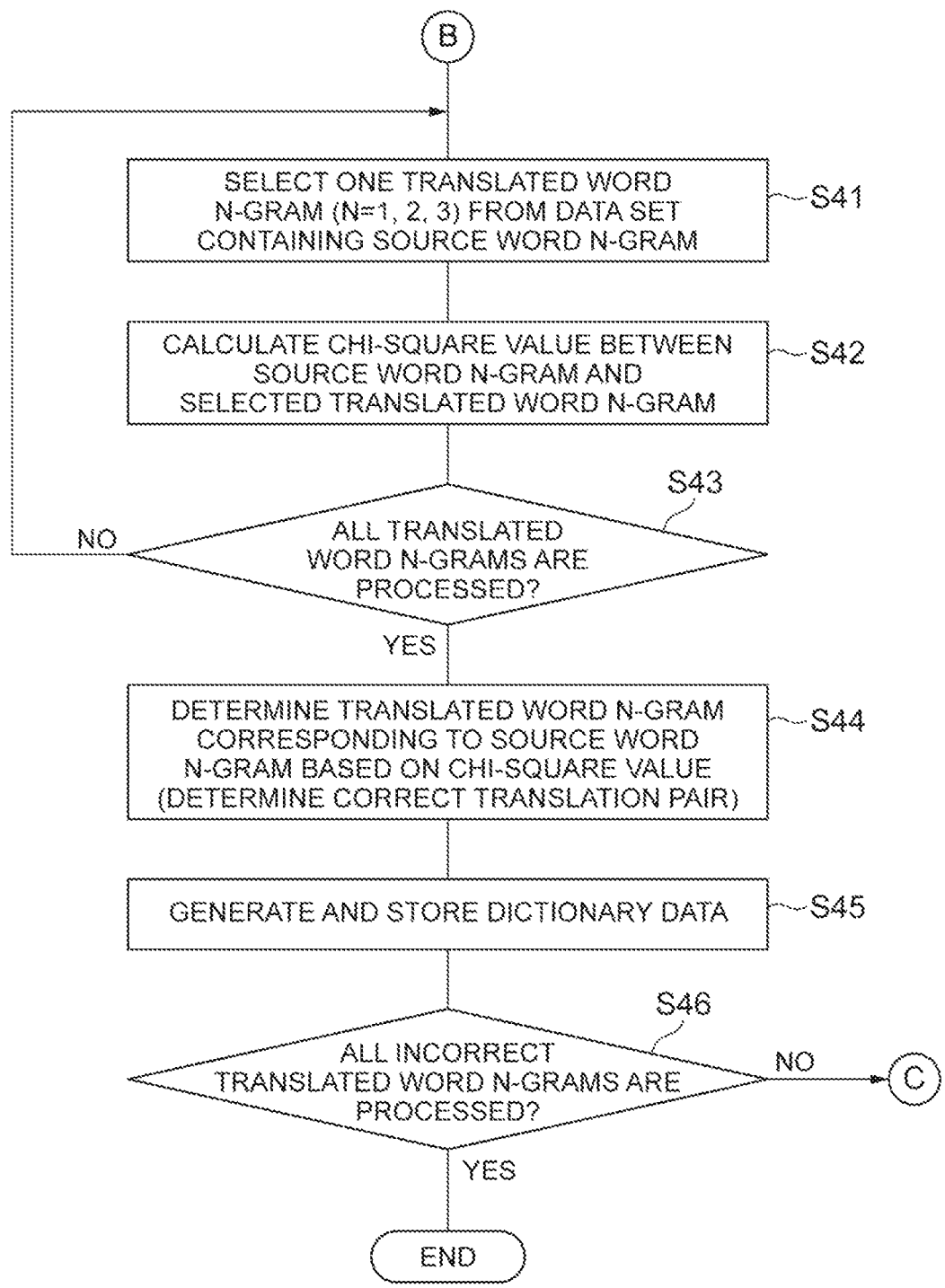
FIG. 8 is a flowchart showing the details of processing of generating dictionary data.

The processes shown in FIGS. 6 to 8 are described hereinafter. FIGS. 6 to 8 are flowcharts showing the details of processing of generating dictionary data (Step S3). In Step S3, the generation unit 13 extracts, from words (word unigrams) of one or more target translated texts, words that do not match the correct word set (Step S31), and selects, from the extracted words, a word whose number of appearances is equal to or higher than a predetermined threshold (Step S32). The generation unit 13 then extracts one or more word bigrams and one or more word trigrams containing the selected word (Step S33), and calculates PMI for each of the word bigrams and the word trigrams (Step S34). Then, the generation unit 13 acquires the word bigram or the word trigram whose PMI is equal to or higher than a predetermined threshold as the incorrect translated word n-gram (n=2, 3) (Step S35).

The process shown in FIG. 7 is described next. The generation unit 13 selects one incorrect translated word n-gram (Step S36), and selects one source word n-gram from the data set $D'_{ej}$ containing this incorrect translated word n-gram (Step S37). The source word n-gram selected in this step is a word unigram, a word bigram, or a word trigram. Next, the generation unit 13 calculates the chi-square value between the incorrect translated word n-gram (n=2 or 3) and the selected source word n-gram (n=1, 2 or 3) (Step S38). The generation unit 13 performs the processing in Steps S37 and S38 for all the source word n-grams in the data set $D'_{ej}$ (see Step S39). Then, the generation unit 13 determines the source word n-gram corresponding to the selected incorrect translated word n-gram based on the chi-square value (Step S40). This processing is determination of an incorrect translation pair. The generation unit 13 may determine this pair automatically, or semi-automatically according to user input.

The process shown in FIG. 8 is described next. The generation unit 13 selects one translated word n-gram from the data set $D'_{je}$ containing the determined source word n-gram, which is the source word n-gram in the incorrect translation pair (Step S41). The translated word n-gram selected in this step is a word unigram, a word bigram, or a word trigram. Next, the generation unit 13 calculates the chi-square value between the source word n-gram (n=1, 2 or 3) and the selected translated word n-gram (n=1, 2 or 3) (Step S42). The generation unit 13 performs the processing in Steps S41 and S42 for all the translated word n-grams in the data set $D'_{je}$ (see Step S43). Then, the generation unit 13 determines the translated word n-gram corresponding to the source word n-gram based on the chi-square value (Step S44). This processing is determination of a correct translation pair. The generation unit 13 may determine this pair automatically, or semi-automatically according to user input.

After determining the incorrect translation pair and the correct translation pair, the generation unit 13 generates dictionary data containing at least the correct translation pair, and stores the dictionary data into the dictionary database 24 (Step S45). The generation unit 13 performs the processing in Steps S36 to S45 for all the incorrect translated word n-grams acquired in Step S35 (see Step S46).

Figure 9:
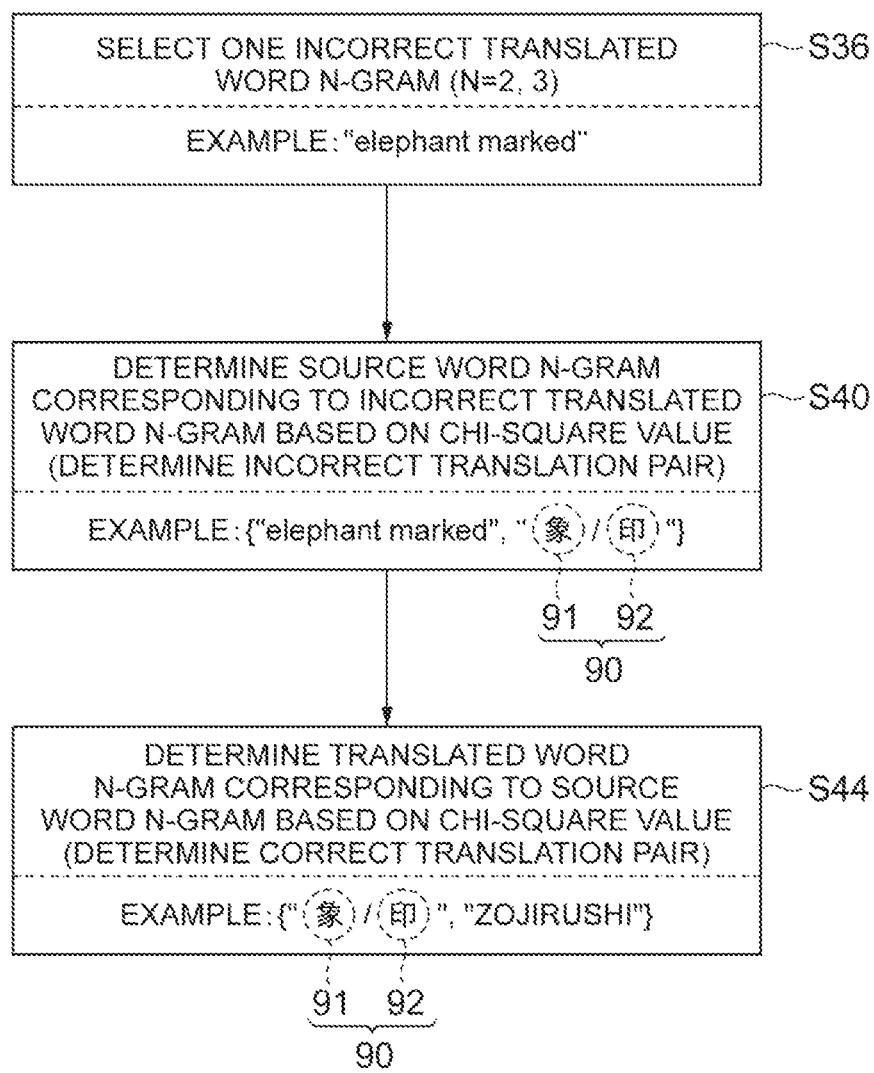
FIG. 9 is a view showing an example of processing of generating dictionary data.

FIG. 9 shows an example of the incorrect translation pair and the correct translation pair obtained by the processing in Step S3, which is an example of generation of the dictionary data. The example of FIG. 9 is an event that has occurred in the actually built translation assistance system 10. It is assumed that, in Step S36, the generation unit 13 selects the incorrect translated word n-gram "elephant marked" shown in the above Table 1. In this case, the generation unit 13 selects, in Step S40, a source word n-gram 90 shown in FIG. 9 for the incorrect translated word n-gram, and determines a pair of those word n-grams as the incorrect translation pair. While the source word n-gram 90 is actually a proper noun of one word, it is sometimes acquired as a sequence of two source words 91 and 92, which is a word bigram, as shown in FIG. 9. In the morphological analysis using ipadic, there is a possibility that a word (e.g., a proper noun) that is not present in the dictionary is divided into a sequence of a plurality of words indicating a general noun. The slash between the source words 91 and 92 indicates that a source word 90, which is actually one word, is divided into two source words 91 and 92. In Step S44, the generation unit 13 can acquire "ZOJIRUSHI" as the translated word n-gram corresponding to the source word n-gram 90, and determine a pair of those word n-grams as the correct translation pair.

Even in the case where a word in the source language is not registered in the dictionary and therefore this word is not recognized correctly as in the example of FIG. 9, the translation assistance system 10 can obtain a correct translation pair by comparing the word n-grams between the source language and the target language.

[Program]

Figure 10:
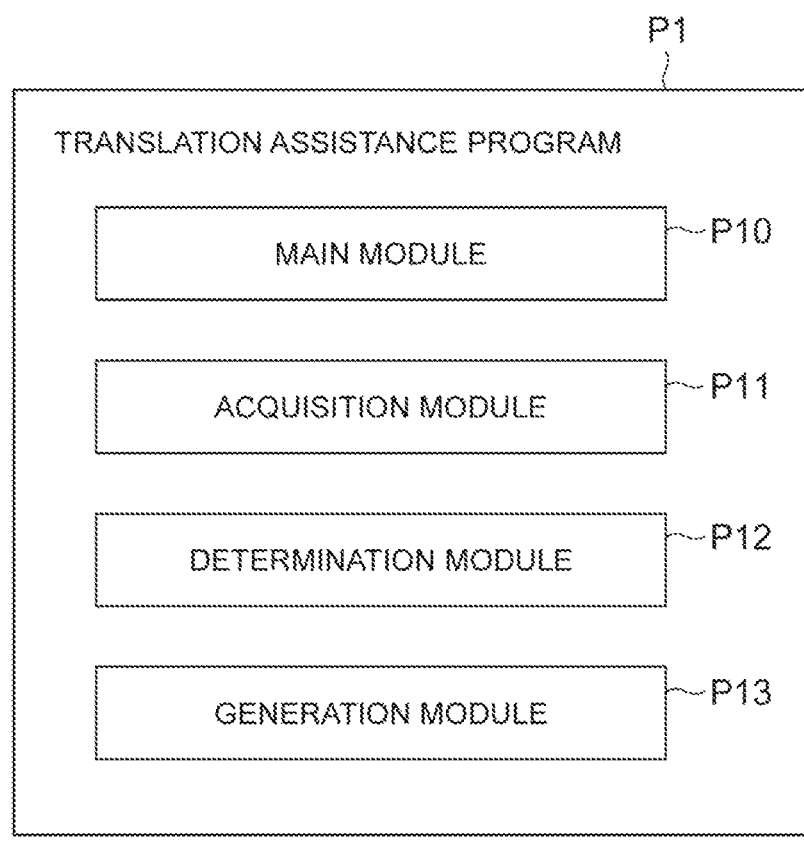
FIG. 10 is a view showing the configuration of a translation assistance program according to an embodiment.

A translation assistance program P1 that causes a computer to function as the translation assistance system 10 is described hereinafter with reference to FIG. 10. FIG. 10 is a view showing the configuration of the translation assistance program P1.

The translation assistance program P1 includes a main module P10, an acquisition module P11, a determination module P12, and a generation module P13. The main module P10 is a part that exercises control over the translation assistance. The acquisition unit 11, the determination unit 12 and the generation unit 13 are implemented respectively by executing the acquisition module P11, the determination module P12, and the generation module P13.

The translation assistance program P1 is provided in the form of being recorded in a static manner on a tangible recording medium such as CD-ROM, DVD-ROM or semiconductor memory, for example. Alternatively, the translation assistance program P1 may be provided as a data signal superimposed onto a carrier wave through a communication network.

Advantageous Effects

As described above, a translation assistance system according to one aspect of the present invention includes an acquisition unit configured to acquire a target translated text obtained by translating a target source text into a target language, and acquire, as a correct word set, a set containing a reference word n-gram forming a reference text written in the target language and independent of the target source text, and a determination unit configured to calculate a degree of matching between one or more translated word n-grams forming the target translated text and the correct word set, and determine adequacy of the target translated text based on the degree of matching.

A translation assistance method according to one aspect of the present invention is a translation assistance method performed by a translation assistance system including at least one processor, the method including an acquisition step of acquiring a target translated text obtained by translating a target source text into a target language, and acquiring, as a correct word set, a set containing a reference word n-gram forming a reference text written in the target language and independent of the target source text, and a determination step of calculating a degree of matching between one or more translated word n-grams forming the target translated text and the correct word set, and determining adequacy of the target translated text based on the degree of matching.

A translation assistance program according to one aspect of the present invention causes a computer system to execute an acquisition step of acquiring a target translated text obtained by translating a target source text into a target language, and acquiring, as a correct word set, a set containing a reference word n-gram forming a reference text written in the target language and independent of the target source text, and a determination step of calculating a degree of matching between one or more translated word n-grams forming the target translated text and the correct word set, and determining adequacy of the target translated text based on the degree of matching.

In the above aspects, a reference text that is prepared as a reference to determine the adequacy of a target translated text (translated text to be evaluated) is a text independent of a target source text, and therefore it is also independent of a translated text of the source text (target translated text). It is thus not necessary to prepare a correct translation of the target translated text in order to evaluate the adequacy of the target translated text. The correct word set is a set of word n-grams of reference texts (reference word n-grams), and it is a set of words or phrases that can be regarded as correct. Thus, with the degree of matching between the word n-gram of the target translated text and the correct word set, it is possible to evaluate the adequacy of the translated text without using a correct translation of the text to be evaluated.

In such aspects of the present invention, the adequacy of a translated text is evaluated by a simple method that calculates the degree of matching of word n-grams between a target translated text and a reference text without using a determination score by a classifier. It is thus possible to appropriately evaluate the translated text with lower processing load on a computer.

If a person evaluates a translated text, a reference text is not needed; however, there is a possibility that criteria for evaluation are unclear, and it takes a long time to process a large amount of translated texts, which results in higher costs. On the other hand, according to the above-described aspects of the present invention, it is possible to promptly and objectively evaluate a large amount of translated texts to be evaluated.

In a translation assistance system according to another aspect, the determination unit may calculate the degree of matching by using a product of a first matching rate and a first weight in a word unigram of a translated word, a product of a second matching rate and a second weight in a word bigram of the translated word, and a product of a third matching rate and a third weight in a word trigram of the translated word, and the second weight may be greater than the first weight, and the third weight may be greater than the second weight. By taking not only a word but also a phrase (a sequence of a plurality of words) into account, it is possible to accurately determine the adequacy of a translated text to be evaluated. Further, because the adequacy of a target translated text is higher as the matching rate for a phrase containing many words is higher, it is possible to accurately determine the adequacy of a translated text to be evaluated by placing a greater weight on a longer sequence of words.

In a translation assistance system according to another aspect, the acquisition unit may acquire, as the correct word set, a set of reference word n-grams forming a reference text belonging to the same category as the target translated text. By using a translated text to be evaluated and a reference text in the same category, it is possible to more accurately determine the adequacy of a word or phrase that is specific to this category. In some cases, one word or phrase in a source language corresponds to a plurality of words or phrases in a target language. In such cases, by taking the category of a text into account, it is possible to obtain one word or phrase in the target language which corresponds to one word or phrase in the source language. As a result, it is possible to more accurately determine the adequacy of the translated text to be evaluated.

A translation assistance system according to another aspect may further include an extraction unit configured to analyze a plurality of reference texts and extract the reference text belonging to the same category as the target translated text based on a degree of matching between a word contained in each reference text and a word contained in the target translated text, and the acquisition unit may acquire the correct word set from the reference text extracted by the extraction unit. In this case, it is possible to use a translated text to be evaluated and a reference text in the same category by automatically classifying target translated texts and reference texts without depending on human work.

A translation assistance system according to another aspect may further include a generation unit configured to determine, from the target source text, one source word n-gram corresponding to one incorrect translated word n-gram extracted from the target translated text determined to be inadequate by the determination unit, determine, from the target translated text, one correct translated word n-gram corresponding to the source word n-gram, and store dictionary data where at least the source word n-gram and the correct translated word n-gram are associated into a dictionary database. By deriving a source word n-gram from an incorrect translated word n-gram and then deriving a correct translated word n-gram from the source word n-gram, it is possible to register a correct translation between the source language and the target language into a dictionary.

In a translation assistance system according to another aspect, the target translated text may comprise a plurality of target translated texts, and the target translated text may comprise a plurality of target translated texts, the generation unit may acquire, for each of the plurality of target translated texts, a pair of a set of the translated word n-gram of the target translated text and a set of the source word n-gram of the target source text corresponding to the target translated text, determine, from one or more pairs containing the incorrect translated word n-gram, the one source word n-gram based on a degree of co-appearance with the incorrect translated word n-gram, and determine, from one or more pairs containing the determined source word n-gram, the one correct translated word n-gram based on a degree of co-appearance with the source word n-gram. In this manner, by deriving a source word n-gram from an incorrect translated word n-gram and then determining a translated word n-gram from the source word n-gram, it is possible to more accurately obtain a correct translation between the source language and the target language.

In a translation assistance system according to another aspect, the generation unit may select a word unigram not matching the correct word set from the one or more translated word n-grams, extract one or more word bigrams or one or more word trigrams containing the word unigram, and acquire, as the incorrect translated word n-gram, a word bigram or a word trigram where pointwise mutual information is equal to or higher than a predetermined threshold among the extracted word bigrams or word trigrams. By generating dictionary data only for a word bigram or a word trigram that is likely to appear, rather than merely processing the word n-gram that does not match the correct word set as the incorrect translated word n-gram, it is possible to efficiently generate the dictionary data with lower processing load on a computer. To be more specific, because the dictionary data for correcting a phrase that is frequently translated incorrectly is generated, it is possible to efficiently improve the quality of the dictionary.

Modified Example

An embodiment of the present invention is described in detail above. However, the present invention is not limited to the above-described embodiment. Various changes and modifications may be made to the present invention without departing from the scope of the invention.

Although the translation assistance system 10 includes the generation unit 13 in the above-described embodiment, the generation unit is not an essential element and may be omitted. In this case, the translation assistance system may refrain from accessing the dictionary database.

Although the acquisition unit 11 acquires the correct word set by dividing the reference text into one or more words in the above-described embodiment, the correct word set may be stored in advance in the reference text database. In this case, the acquisition unit reads the correct word set from the reference text database, and the determination unit (and the generation unit) can use this correct word set as it is. In this modified example, the category may be associated with each reference word n-gram.

Although the translation assistance system 10 processes a word unigram, a word bigram and a word trigram in the above-described embodiment, the translation assistance system may perform the above-described process by using only a word unigram and a word bigram without using a word trigram.

Further, the procedure of the translation assistance method that is performed by at least one processor is not limited to the example shown in the above example. For example, some of the above-described steps (processing) may be omitted, or the steps may be carried out in a different order. Further, any two or more steps of the above-described steps may be combined, or some of the steps may be modified or eliminated. Alternatively, another step may be performed in addition to the above-described steps.

When comparing two numerical values in the translation assistance system, any one of "equal to or more than" and "more than" may be used, and any one of "equal to or less than" and "less than" may be used. Selection of those words would not change the technical significance regarding the processing of comparing two numerical values.

What is claimed is:

1. A translation assistance system comprising:
   at least one memory operable to store program code; and
   at least one processor operable to read the program code and operate as instructed by the program code, the program code including:
   acquisition code configured to cause the at least one processor to acquire a target translated text obtained by translating a target source text into a target language, and acquire, as a correct word set, a set containing a reference word n-gram forming a reference text written in the target language and independent of the target source text;
   determination code configured to cause the at least one processor to calculate a degree of matching between one or more translated word n-grams forming the target translated text and the correct word set, and compare the degree of matching with a first threshold to determine adequacy of the target translated text based on the degree of matching; and
   generation code configured to cause the at least one processor to, based on the degree of matching being less than the first threshold, determine one or more corrected translated word n-grams corresponding to the target source text and store the one or more corrected translated word n-grams in association with the target source text in a dictionary database.

2. The translation assistance system according to claim 1, wherein the determination code is configured to cause the at least one processor to calculate the degree of matching by using a product of a first matching rate and a first weight in a word unigram of a translated word, a product of a second matching rate and a second weight in a word bigram of the translated word, and a product of a third matching rate and a third weight in a word trigram of the translated word, where the second weight is greater than the first weight, and the third weight is greater than the second weight.

3. The translation assistance system according to claim 1, wherein the acquisition code is configured to cause the at least one processor to acquire, as the correct word set, a set of reference word n-grams forming a reference text belonging to the same category as the target translated text.

4. The translation assistance system according to claim 3, wherein the program code further includes extraction code configured to cause the at least one processor to analyze a plurality of reference texts and extract the reference text belonging to the same category as the target translated text based on a degree of matching between a word contained in each reference text and a word contained in the target translated text, and wherein
   the acquisition code is configured to cause the at least one processor to acquire the correct word set from the reference text extracted by the extraction code.

5. The translation assistance system according to claim 1, wherein the generation code is further configured to cause the at least one processor to determine, from the target source text, one source word n-gram corresponding to one incorrect translated word n-gram extracted from the target translated text determined to be inadequate by the determination code, determine, from the target translated text, one correct translated word n-gram corresponding to the source word n-gram, and store dictionary data where at least the source word n-gram and the correct translated word n-gram are associated into a dictionary database.

6. The translation assistance system according to claim 5, wherein the target translated text comprises a plurality of target translated texts, and the target source text comprises a plurality of target source texts, and
   wherein the generation code is configured to cause the at least one processor to:
   acquire, for each of the plurality of target translated texts, a pair of a set of the translated word n-gram of the target translated text and a set of the source word n-gram of the target source text corresponding to the target translated text;
   determine, from one or more pairs containing the incorrect translated word n-gram, the one source word n-gram based on a degree of co-appearance with the incorrect translated word n-gram; and determine, from one or more pairs containing the determined source word n-gram, the one correct translated word n-gram based on a degree of co-appearance with the source word n-gram.

7. The translation assistance system according to claim 5, wherein the generation code is configured to cause the at least one processor to:

select a word unigram not matching the correct word set from the one or more translated word n-grams;

extract one or more word bigrams or one or more word trigrams containing the word unigram; and acquire, as the incorrect translated word n-gram, a word bigram or a word trigram where pointwise mutual information is equal to or higher than a predetermined threshold among the extracted word bigrams or word trigrams.

8. A translation assistance method performed by a translation assistance system including at least one processor, the method comprising:

acquiring a target translated text obtained by translating a target source text into a target language, and acquiring, as a correct word set, a set containing a reference word n-gram forming a reference text written in the target language and independent of the target source text;

calculating a degree of matching between one or more translated word n-grams forming the target translated text and the correct word set;

comparing the degree of matching with a first threshold to adequacy of the target translated text based on the degree of matching;

determining, based on the degree of matching being less than the first threshold, one or more corrected translated word n-grams corresponding to the target source text; and storing the one or more corrected translated word n-grams in association with the target source text in a dictionary database.

9. A non-transitory recording medium storing a translation assistance program causing a computer system to:

acquire a target translated text obtained by translating a target source text into a target language, and acquiring, as a correct word set, a set containing a reference word n-gram forming a reference text written in the target language and independent of the target source text;

calculate a degree of matching between one or more translated word n-grams forming the target translated text and the correct word set, and compare the degree of matching with a first threshold to determine adequacy of the target translated text based on the degree of matching; and based on the degree of matching being less than the first threshold, determine one or more corrected translated word n-grams corresponding to the target source text and store the one or more corrected translated word n-grams in association with the target source text in a dictionary database.

* * * * *